(12) United States Patent
Furukawa et al.

(10) Patent No.: US 7,053,500 B2
(45) Date of Patent: May 30, 2006

(54) AUTOMOTIVE ELECTRIC POWER UNIT

(75) Inventors: Katsuhiko Furukawa, Utsunomiya (JP); Keisuke Urushihara, Utsunomiya (JP); Yuuichi Nakamura, Kawaguchi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 562 days.

(21) Appl. No.: 10/310,959

(22) Filed: Dec. 6, 2002

(65) Prior Publication Data

US 2003/0117019 A1 Jun. 26, 2003

(30) Foreign Application Priority Data

Dec. 10, 2001 (JP) .............................. 2001-376340

(51) Int. Cl.
*B60R 22/00* (2006.01)

(52) U.S. Cl. .................................................... 307/10.6
(58) Field of Classification Search ................ 307/10.6
See application file for complete search history.

(56) References Cited

U.S. PATENT DOCUMENTS

| 5,793,189 A | 8/1998 | Kawaguchi et al. |
| 5,877,951 A | 3/1999 | Mweene |
| 6,677,725 B1 * | 1/2004 | Tamai et al. ................. 320/103 |

FOREIGN PATENT DOCUMENTS

| JP | 63-109534 | 7/1988 |
| JP | 03-284191 | 12/1991 |
| JP | 08-171435 | 7/1996 |
| JP | 10-39936 | 2/1998 |
| JP | 2001-239902 | 9/2001 |

OTHER PUBLICATIONS

Canadian Patent Office Communication dated Feb. 18, 2004 in corresponding Application No. 2,413,560.

* cited by examiner

*Primary Examiner*—Robert L. Deberadinis
(74) *Attorney, Agent, or Firm*—Westerman, Hattori, Daniels & Adrian, LLP.

(57) ABSTRACT

An automotive electric power unit is provided to reduce the occurrence of electromagnetic noise caused by change in magnetic fields when the current dropps to zero when an ignition switch is being switched off. When the ignition switch is switched off, an input voltage to an ON/OFF control terminal of a DC/DC converter gently decreases through a potential difference between terminals of a motor driving load connected thereto. Accordingly, a control device, for which a detecting voltage is set relatively high, first detects an OFF state of the ignition switch and disconnects power loads such as a cooling fan, air conditioner, and defroster from the DC/DC converter by regulating relays. Then, the DC/DC converter, for which a detecting voltage is set lower than the detecting voltage for the control device, detects the OFF state of the ignition switch and stops stepping down the voltage so that a charging current for a battery of the load current thereof is shut off.

6 Claims, 6 Drawing Sheets

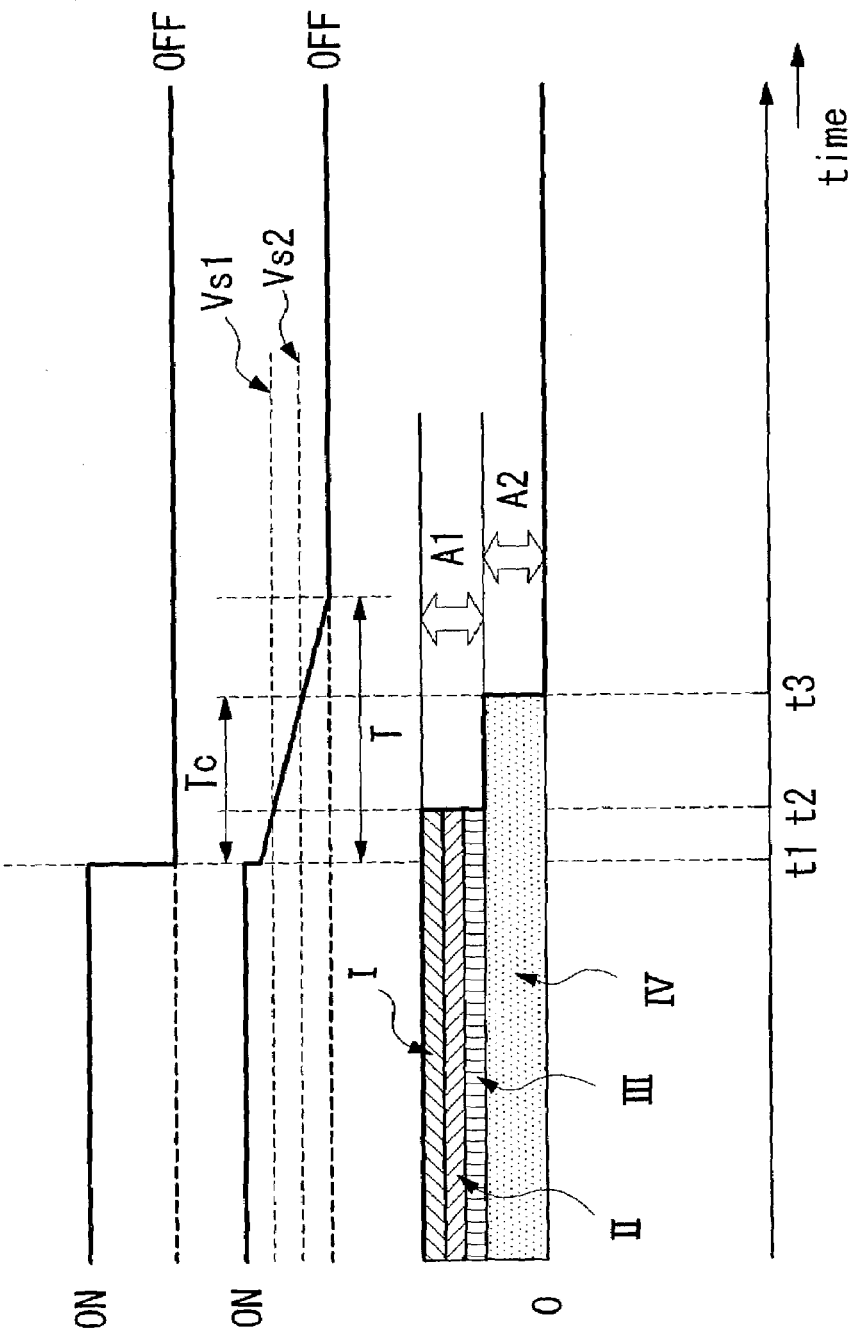

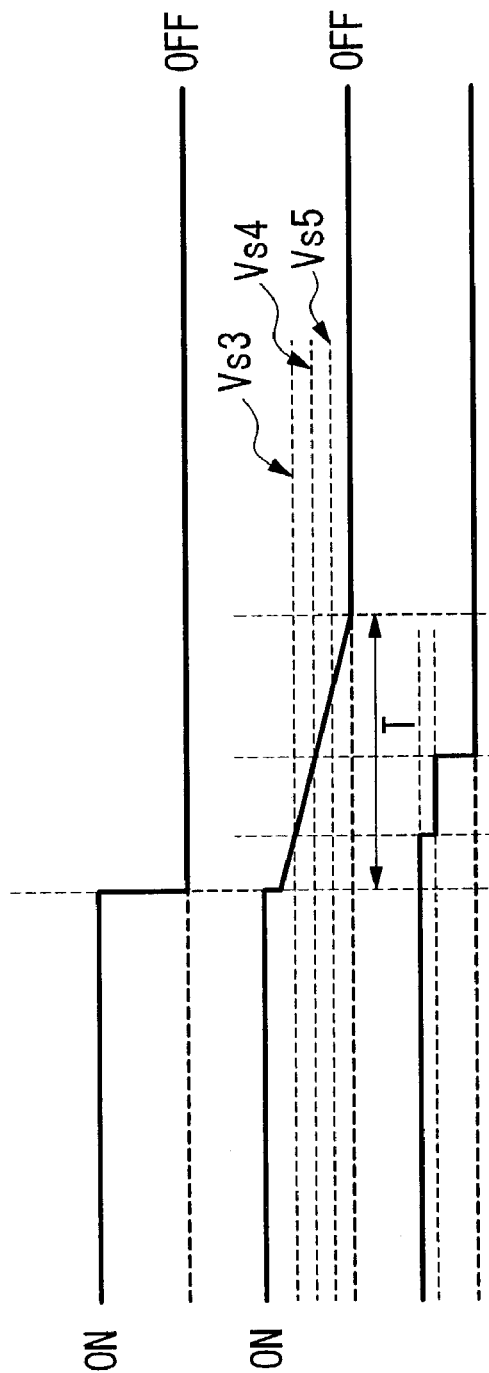
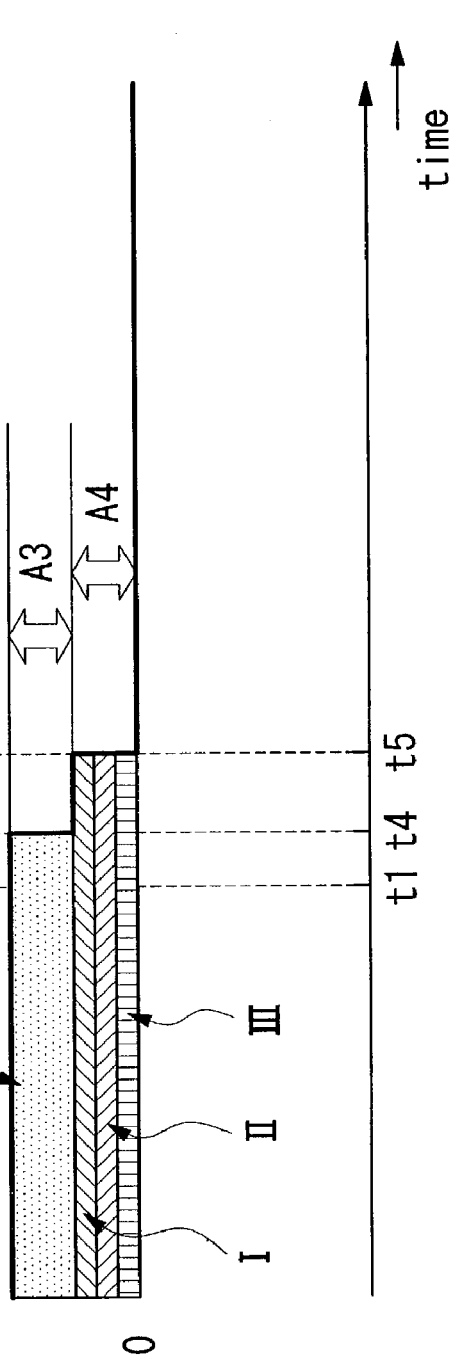
FIG. 5A
FIG. 5B
FIG. 5C
FIG. 5D
FIG. 5E

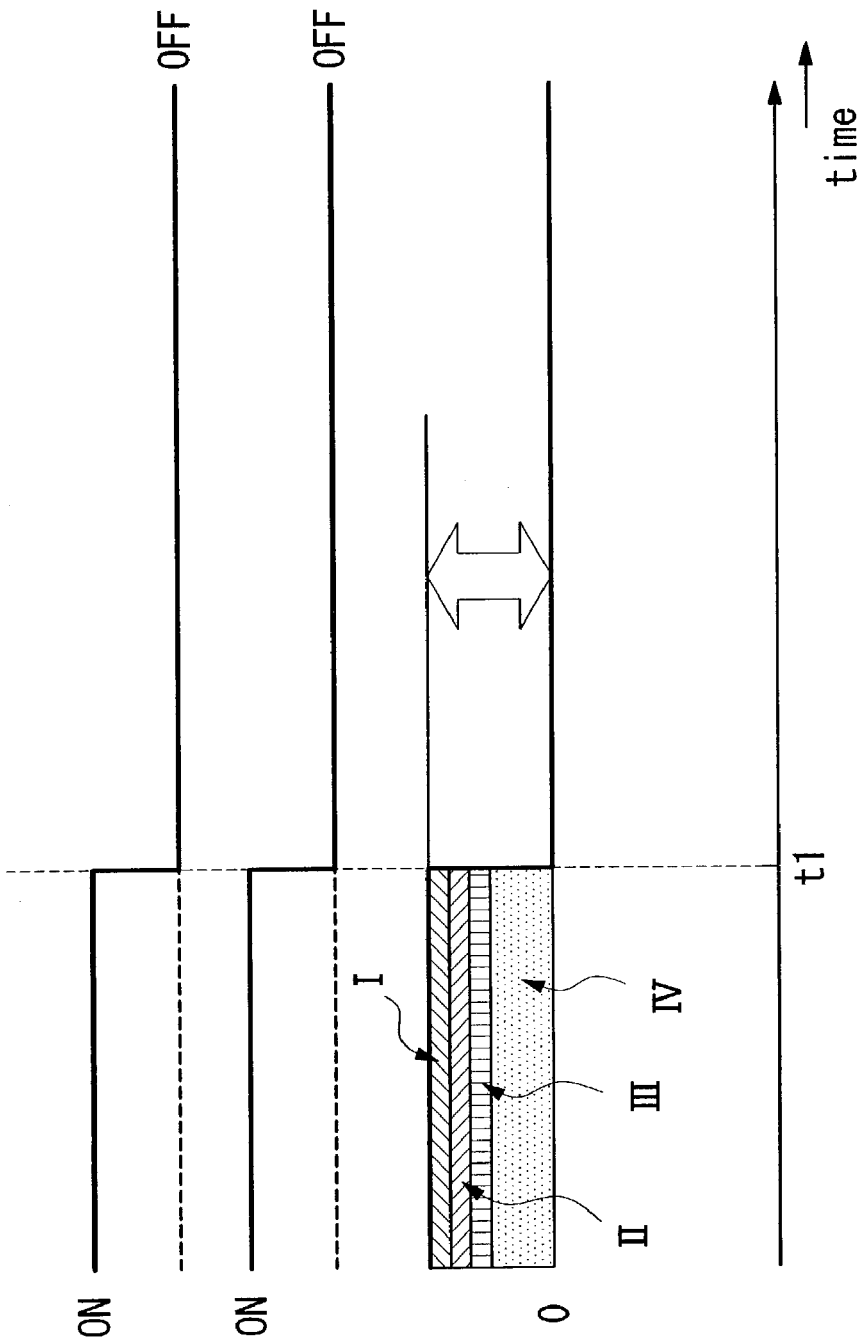

AUTOMOTIVE ELECTRIC POWER UNIT

BACKGROUND OF THE INVENTION

1. Field of the Invention

The present invention relates to an automotive electric power unit for supplying electric power to components of a vehicle.

2. Related Art

EV (Electric Vehicles) or HEV (Hybrid Electric Vehicles) are usually equipped with a DC/DC converter converting a voltage higher than 12 volts of a high voltage battery into a lower voltage so that electric power is supplied to power units for a control computer for the vehicle as well as auxiliary machineries such as cooling fans, air conditioners, and fuel pumps. To the output terminals of the DC/DC converter, besides a battery, various auxiliary machineries such as a cooling fan, an air conditioner, and a fuel pump are connected in parallel in such a way that the DC/DC converter and the auxiliary machineries or equipment are switched off at the same instant when a n ignition switch for actuating the vehicle is turned off.

As described in JP-A-2001-239902, while monitoring the remaining power in a battery, also in an idling vehicle, vehicle-mounted auxiliary machineries i.e. "power loads" may be actuated by the power of a high voltage battery, when the remaining power of the high voltage battery is large enough to activate a motor starter.

SUMMARY OF THE INVENTION

However, using a conventional automotive electric power unit as described above, when a ignition switch or key switch is being switched off, the current of a power unit such as a DC/DC converter will abruptly drop to zero, so a magnetic field surrounding output lines of the electric power unit such as a DC/DC converter is also drastically changed in connection with the rapid change in the current so that noise problems occur through the radical change in the magnetic field.

This will be described more precisely with reference to FIGS. 6A to 6D. As shown in FIG. 6A, the ignition switch is being switched off at time t1, a state of an ON/OFF control terminal of the DC/DC converter changes to "OFF" as shown in FIG. 6B. FIG. 6C shows that the output current of the DC/DC converter is rapidly decreased as a consequence of the change in the state of the ON/OFF control terminal. This causes an abrupt change in the magnetic field around the output line of the DC/DC converter so that the change in the magnetic field results in electromagnetic noise as shown by FIG. 6D.

Thus, for the automotive electric power unit, it is strongly required to prevent the occurrence of electromagnetic noise due to the abrupt change in the current of the power unit, and consequently to reduce the influence on the environment.

The present invention is provided to solve the problems described above in an automotive electric power unit that enables reduction of the occurrence of the electromagnetic noise caused by variations in magnetic field upon the current dropping to zero when the ignition switch is being switched off.

A first aspect of the present invention relates to an automotive electric power unit comprising a first charging device (a high voltage battery 1 described later in preferred embodiments, for example), a second charging device (12 V battery 6 described in the embodiments, for example) charged by applying voltage which is stepped down from the electric energy accumulated in the first charging device by a DC/DC converter (a DC/DC converter 5 described in the embodiments, for example), and a control device (ECU 19-1 described in the embodiments, for example) controlling a plurality of power loads (a cooling fan 7, air conditioner 8, and a defroster 9, for example) connected to the second charging device, wherein the control device shuts down the power loads and subsequently allows the DC/DC converter stop stepping down the voltage, upon an ignition switch (an ignition switch 17 described in the embodiments, for example) for actuating the vehicle being switched off.

According to the automotive electric power device having the above described components, the control device first shutting down the power loads and subsequently allowing the DC/DC converter stop stepping down the voltage, it becomes possible that the load current of the DC/DC converter is varied two times corresponding to the stop of the operation of the power loads and the stop of the conversion of the voltage by the DC/DC converter, and that the range of variation of the load current of the DC/DC converter at one time becomes narrower.

A second aspect of the present invention relates to an automotive electric power unit described in the first aspect of the automotive electric power unit, wherein the automotive electric power unit having a motor driving load (a motor driving load 16 described later in preferred embodiments, for example) connected to the second charging device by way of the ignition switch and coming to a stop while generating an inductive voltage after the ignition switch has been switched off; the control device shuts down the power loads when the inductive voltage dropps below a first set value of voltage (a set value Vs1 described in the embodiments, for example); and the DC/DC converter stops stepping down the voltage when the inductive voltage dropps below a second set value of voltage (a set value Vs2 described in the first embodiment, for example) which is lower than the first set value.

According to the automotive electric power device having the above described components, because of a feature wherein the voltage or the potential difference between the two terminals of the motor driving load tends to gently decrease due to the inductive voltage until the motor driving load comes to a rest, it becomes possible to make a difference between a timing for shutoff of the load current and a timing for stop of the voltage conversion by the DC/DC converter through the different first and second set value of voltages.

A third aspect of the present invention relates to an automotive electric power unit described in the first aspect of the automotive electric power unit, wherein the automotive electric power unit having a capacitive load connected to the second charging device by way of the ignition switch and providing a voltage or a discharge voltage arising between both terminals through a discharge of the electric power stored in its power load after the ignition switch being switched off; the control device shuts down the power loads when the discharge voltage dropps below a first set value of voltage; and the DC/DC converter stops stepping down the voltage when the discharge voltage dropps below a second set value of voltage which is lower than the first set value.

According to the automotive electric power device having the above described components, because of a feature wherein the voltage or the potential difference between both terminals of the capacitive load tends to gently decrease due to the discharge until the accumulated charge becomes zero, it becomes possible to make a difference between a timing for shutoff of the load current and a timing for stop of the voltage conversion by the DC/DC converter through the different first and second set value of voltages.

A fourth aspect of the present invention relates to an automotive electric power unit comprising a first charging device (a high voltage battery 1 described later in preferred embodiments, for example), a second charging device (12 V battery 6 described in the embodiments, for example) charged by applying voltage which is stepped down from the electric energy accumulated in the first charging device by a DC/DC converter (a DC/DC converter 20 described in the embodiments, for example), and a control device (ECU 19-1 described in the embodiments, for example) controlling a plurality of power loads (a cooling fan 7, air conditioner 8, and a defroster 9, for example) connected to the second charging device, wherein the control device first allows the DC/DC converter decrease its stepped down output voltage and subsequently shuts down the power loads after the output voltage has been decreased, upon an ignition switch for actuating the vehicle being switched off.

According to the automotive electric power device having the above described components, the control device first allowing the DC/DC converter decrease the output voltage and shut off the charging current for the second charging device and subsequently shutting down the power loads, it becomes possible for the load current of the DC/DC converter to vary two times corresponding to the stop of the operation of the power loads and the stop of the conversion of the voltage by the DC/DC converter, and that the range of variation of the load current of the DC/DC converter at a time becomes narrower.

A fifth aspect of the present invention relates to an automotive electric power unit described in the fourth aspect of the automotive electric power unit, wherein the automotive electric power unit having a motor driving load connected to the second charging device by way of the ignition switch and coming to a stop while generating an inductive voltage after the ignition switch being switched off; the DC/DC converter decreases its stepped down output voltage when the inductive voltage dropping below a first set value of voltage (a set value Vs3 described later in the second embodiment, for example); and the control device shuts down the power loads when the inductive voltage dropping below a second set value of voltage (a set value Vs4 described later in the second embodiment, for example) which is lower than the first set value.

According to the automotive electric power device having the above described components, because of a feature wherein the voltage or the potential difference between the two terminals of the motor driving load tends to gently decrease due to the inductive voltage until the motor driving load comes to a rest, it becomes possible to make a difference between a timing for shutoff of the charging current for the second battery through the decrease of the output voltage of the DC/DC converter and a timing for shutdown of the power load by the control device through the different first and second set value of voltages.

A sixth aspect of the present invention relates to an automotive electric power unit described in the fourth aspect of the automotive electric power unit, wherein the automotive electric power unit having a capacitive load connected to the second charging device by way of the ignition switch and providing a voltage or a discharge voltage arising between its both terminals through a discharge of the electric power stored in its power load after the ignition switch has been switched off; the DC/DC converter decreases its stepped d own output voltage when the discharge voltage dropping below a first set value of voltage; and the control device shuts down the power loads when the discharge voltage dropps below a second set value of voltage which is lower than the first set value.

According to the automotive electric power device having the above described components, because of a feature wherein the voltage or the potential difference between the two terminals of the capacitive load tends to gently decrease due to the discharge until the accumulated charge becomes zero, it becomes possible to make a difference between a timing for shutoff of the charging current for the second battery through the decrease of the output voltage of the DC/DC converter and a timing for shutdown of the power load by the control device through the different first and second set value of voltages.

As described above, according to the first aspect of the automotive power unit of the present invention, using an ECU as the control device or the automotive control computer, it becomes possible for the power load to be first shut down and the voltage conversion by the DC/DC converter is then stopped so that the range of variation of the load current of the DC/DC converter at a time becomes narrower.

Thus, it becomes possible for the amount of the electromagnetic noise caused by the change in the load current when the DC/DC converter has been turned off to be decreased in comparison with the case in which the whole load current of the DC/DC converter is totally shut off.

Also, according to the second aspect of the automotive power unit of the present invention, because of a feature wherein the potential difference between the two terminals of the motor driving load tends to gently decrease due to the inductive voltage until the motor driving load comes to a rest, it becomes possible to make a difference between a timing for shutoff of the load current and a timing for stop of the voltage conversion by the DC/DC converter.

Accordingly, it becomes possible to control the load current of the DC/DC converter taking advantage of the feature of the motor driving load at hand without providing a timing measure means such as a timer.

Also, according to the third aspect of the automotive power unit of the present invention, because of a feature wherein the potential difference between the two terminals of the capacitive load tends to gently decrease due to the discharge until the accumulated charge becomes zero, it becomes possible to make a difference between a timing for shutoff of the load current and a timing for stop of the voltage conversion by the DC/DC converter.

Accordingly, it becomes possible to control the load current of the DC/DC converter taking advantage of the capacitive load at hand without providing a timing measure means such as a timer.

Also, according to the fourth aspect of the automotive power unit of the present invention, it becomes possible that the charging current for the second battery is first shut off because of the decrease of the output voltage of the DC/DC converter and the power load is subsequently stopped by the control device or the automotive control computer so that the range of variation of the load current of the DC/DC converter at a time becomes narrower.

Thus, in a fashion analogous to the first aspect of the invention, it becomes possible for the amount of the electromagnetic noise caused by the change in the load current when the DC/DC converter has been turned off to be decreased in comparison with the case in which the whole load current of the DC/DC converter is totally shut off.

Also, according to the fifth aspect of the automotive power unit of the present invention, because of a feature wherein the potential difference between the two terminals of the motor driving load tends to gently decrease due to the inductive voltage until the motor driving load comes to a rest, it becomes possible to make a difference between a timing for shutoff of the charging current for the second battery through the decrease of the output voltage of the DC/DC converter and a timing for shutdown of the power load by the control device.

Accordingly, in a fashion analogous to the second aspect of the invention, it becomes possible to control the load current of the DC/DC converter taking advantage of the feature of the motor driving load at hand without providing a timing measure means such as a timer.

Also, according to the sixth aspect of the automotive power unit of the present invention, because of a feature wherein the potential difference between the two terminals of the capacitive load tends to gently decrease through the discharge until the accumulated charge becomes zero, it becomes possible to make a difference between a timing for shutoff of the charging current for the second battery through the decrease of the output voltage of the DC/DC converter and a timing for shutdown of the power load by the control device.

Accordingly, in a fashion analogous to the third aspect of the invention, it becomes possible to control the load current of the DC/DC converter taking advantage of the feature of the capacitive load at hand without providing a timing measure means such as a timer.

BRIEF DESCRIPTION OF THE DRAWINGS

FIGS. 3A to 3D is a diagram illustrating temporal variations of the operating status of the automotive electric power unit according to the embodiment of FIG. 1.

FIGS. 5A to 5E is a diagram illustrating temporal variations of the operating status of the automotive electric power unit according to the embodiment of FIG. 4.

FIGS. 6A to 6D is a diagram illustrating temporal variations of the operating status of a conventional automotive electric power unit.

DETAILED DESCRIPTION OF THE PREFERRED EMBODIMENTS

Preferred embodiments will be explained with reference to the drawings.

First Embodiment

Figure 1:
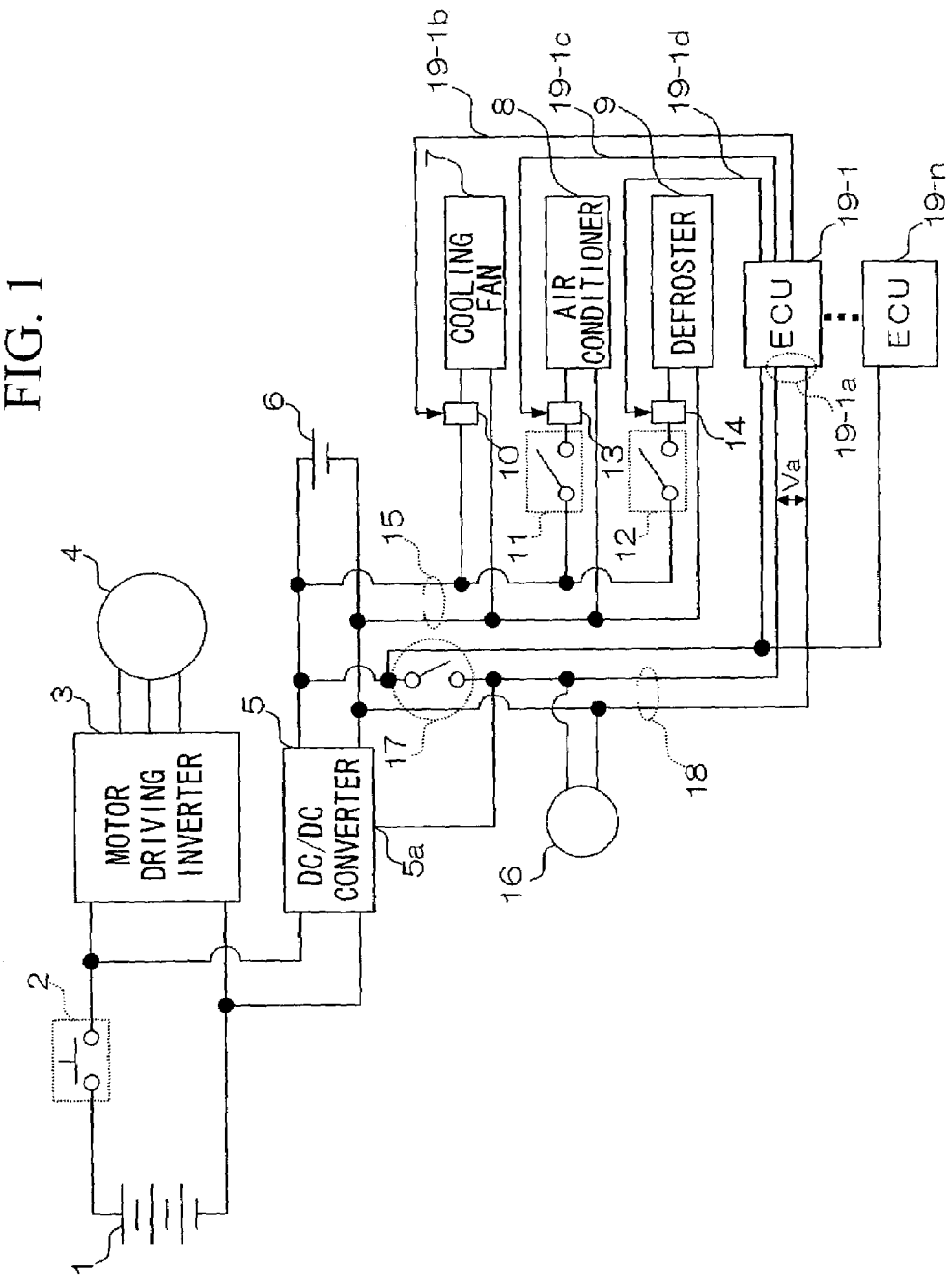
FIG. 1 is a block diagram showing a connection and a configuration of electrical equipment including an automotive electric power unit according to the first embodiment of the present invention.

FIG. 1 is a block diagram showing a connection and a configuration of electrical equipment including an automotive electric power unit according to the first embodiment of the present invention.

In FIG. 1, reference numeral 1 represents an electric power supply in the automotive electric power unit according to the present embodiment, or more specifically a high voltage battery in which voltage is higher than 12 volts (144 volts for example). A high voltage switch 2 is a switch to connect or disconnect connection lines in order to select whether or not the power of the high voltage battery 1 is supplied to individual parts of the vehicle.

A motor driving inverter 3 changes the power which is supplied by way of the high voltage switch 2 from the high voltage battery 1 into a three-phase power which is supplied to a three-phase alternating current motor 4 for driving the vehicle. High voltage battery 1, incidentally, is charged by the regenerative energy of the three-phase alternating current motor 4 by way of the motor driving inverter 3. Also, high voltage battery 1 may be connected to an alternator, which generates electric power with a rectifying circuit and revolutions of the engine, by way of the high voltage switch 2.

A DC/DC converter 5 is configured in such a way that the power which is supplied by way of the high voltage switch 2 from the high voltage battery 1 is converted into a power at a voltage of 12 volts as power sources for an automotive control computer and auxiliary machineries such as a cooling fan, an air conditioner, and a fuel pump and the like. DC/DC converter 5 is provided with an ON/OFF control terminal 5a for controlling its ON/OFF state. Here, only when a control signal input to the ON/OFF control terminal 5a is in a "HIGH" state, DC/DC converter 5 outputs the power so that the input power from the high voltage battery 1 is converted into the power at the voltage of 12 volts. The DC/DC converter 5 stops stepping down the voltage, when the control signal input to the ON/OFF control terminal 5a is in a "LOW" state.

Furthermore, a 12 V battery 6, which is being charged by the converted output voltage or the stepped down output voltage of 12 volts, is connected to an output line of the DC/DC converter 5. Moreover, cooling fan 7, air conditioner 8, and defroster 9 and others as auxiliary machineries of the vehicle (here, only representative examples are described and other machineries, apparent for those skilled in the art, will be omitted) are also connected in parallel to the DC/DC converter 5 (also to both terminals of the 12 V battery 6) by way of switching systems and the like.

Describing now the connection of the auxiliary machineries more precisely, cooling fan 7 is a fan to provide cooling for the motor driving inverter 3 and/or the three-phase alternating current motor 4 and is connected to both DC/DC converter 5 and 12 V battery 6 by way of a relay 10 which is controlled by a below-described automotive control computer. Air conditioner 8 is an automotive air conditioning system, and defroster 9 is a de-misting and de-icing device for a window of the vehicle. Air conditioner 8 and defroster 9 are connected in parallel to both DC/DC converter 5 and 12 V battery 6 by way of an air conditioner switch 11 and a defroster switch 12 as well as relays 13 and 14 which are controlled by a below-described automotive control computer, respectively.

Also, air conditioner switch 11, defroster switch 12, relay 13 and 14 are placed in the positive side of connection lines 15. Air conditioner switch 11 and defroster switch 12 are actuated by vehicle drivers and/or passengers, and relays 10, 13, and 14 are controlled by the automotive control computer to operate the connection or disconnection between DC/DC converter 5 as well as 12 V battery 6 and each auxiliary machinery.

Furthermore, a motor driving load or a loading motor 16 such as a motor for a fuel pump installed in individual parts of the vehicle is connected to the output line of DC/DC converter 5 (also both sides of 12 V battery 6) by way of an ignition switch 17 which is used for starting and stopping the power supply to the motor driving load 16. Here, ignition switch 17 is placed in the positive side of connection lines 18 which connects motor driving load 16 to DC/DC converter 5 and to 12 V battery 6. Upon ignition switch 17 being switched on by a vehicle driver, the power is supplied to individual parts of the vehicle including motor driving load 16, and the vehicle is then actuated.

A plurality of ECU 19-1 to 19-n as automotive control computers, which are installed in individual parts of the vehicle, are also connected in parallel to the output line of DC/DC converter 5 (also both sides of 12 V battery 6). Only ECU 19-1 of ECU 19-1 to 19-n is provided with voltage monitoring terminal 19-1a. Here, voltage monitoring terminal 19-1a is a control terminal which is used to control output signals into control lines 19-1b, 19-1c and 19-1d which are extending out of ECU 19-1. Only when an input control signal to voltage monitoring terminal 19-1a is in a "HIGH" state, ECU 19-1 brings relays 10, 13, and 14 into conduction. When an input control signal to voltage monitoring terminal 19-1a is in a "LOW" state, ECU 19-1 brings relays 10, 13, and 14 out of conduction.

The connection lines 18 connecting ignition switch 17 and motor driving load 16 is also connected to voltage monitoring terminal 19-1a of ECU 19-1. Hence, ECU 19-1 regulates relays 10, 13, and 14, which are connected to control lines 19-1b, 19-1c and 19-1d, and then disconnects cooling fan 7, air conditioner 8 and defroster 9 from DC/DC converter as well as 12 V battery 6, upon detecting the switch off of ignition switch 17 (switching off or disconnecting action of the ignition switch) through a change in the voltage which is input to the voltage monitoring terminal 19-1a via the connection lines 18.

The positive side of the connection lines 18 is also connected to the ON/OFF control terminal 5a of the DC/DC converter 5 so that DC/DC converter 5 stops converting the voltage into a lower level of the voltage upon the switch off of ignition switch 17 being detected through a change in the voltage which is input to ON/OFF control terminal 5a via the connection lines 18.

Here, a set value Vs1 (a first set value of voltage according to a second aspect of the present invention) at which the switch off of ignition switch 17 is detected through voltage monitoring terminal 19-1a of ECU 19-1 is set higher than a set value Vs2 (a second set value of voltage according to claim 2 of the present invention) at which the switch off of ignition switch 17 is detected through ON/OFF control terminal 5a of DC/DC converter 5.

Next, the motor driving load 16 will be described with reference to the accompanying drawings, taking a DC motor as an example.

Figure 2B:
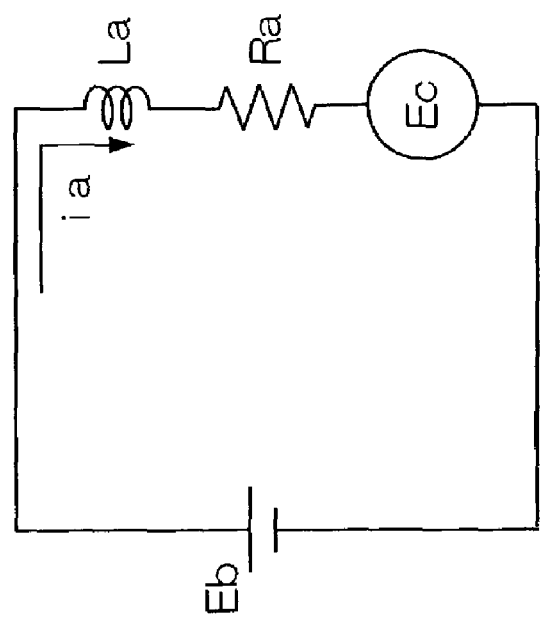
FIGS. 2A and 2B show an equivalent circuit diagram of a DC motor.
Figure 2A:
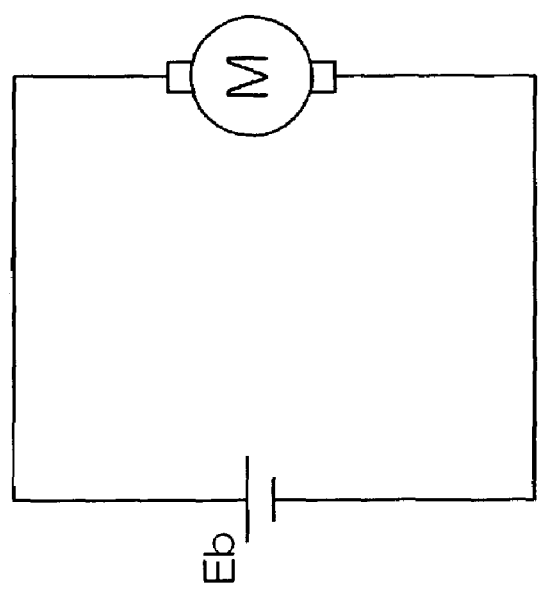

FIG. 2B shows an equivalent circuit diagram of a DC motor described in FIG. 2A. Referring FIG. 2B, a voltage Eb driving the DC motor is given by the following expression, $$Eb = L_a \cdot \frac{di_a}{dt} + R_a \cdot i_a + Ec \qquad (1)$$

where La is an inductance of the armature winding of the DC motor, Ra is an internal resistance of the DC motor, $i_a$ is a current flowing through the DC motor, and Ec is an inductive voltage which is generated by rotations of the DC motor. Here the inductive voltage Ec is given by the following expression with an inductive voltage constant Ke and a number of revolution s of the DC motor N, $$Ec = Ke \cdot N \qquad (2).$$

As a result, using a motor driving load such as DC motor, while the supply voltage to rotate the armature is turned off, a potential difference arises between positive and negative terminals due to the counter electromotive force (inductive voltage) so long as the armature rotates. Therefore, motor driving load 16 has a feature wherein the potential difference between its two terminals tends to gently become small as the rotation rate of the armature slowly decreases, although the supply voltage to these terminals are abruptly shut down.

In the following, the operating principles of the above-mentioned embodiment according to the present invention will be explained with reference to the accompanying drawings.

FIGS. 3A to 3D shows a diagram illustrating temporal variations of the operating status of the automotive electric power unit according to the present embodiment. As shown in FIG. 3A, following the switch-off of the ignition switch 17 at time t1, a voltage Va at the ON/OFF control terminal 5a of the DC/DC converter 5 gradually decreases for a time interval T due to the inductive voltage generated at both terminals of the motor driving load 16 connected to the connection lines 18 as shown in FIG. 3B. Thus, ECU 19-1 first detects the voltage Va dropping below the set value Vs1 at time t2, and subsequently recognizes an OFF state (IG-OFF) of the ignition switch 17 as shown in FIG. 3B. Then, ECU 19-1 regulates relays 10, 13, and 14 at the time t2, and disconnects cooling fan 7, air conditioner 8 and defroster 9 from the connection to DC/DC converter 5 as well as 12 V battery 6 as shown in FIG. 3C.

At this moment, because cooling fan 7, air conditioner 8 and defroster 9 are disconnected from DC/DC converter 5, a load current of defroster I, a load current of air conditioner II, and a load current of cooling fan III become zero, and the output current of the DC/DC converter 5 is then decreased by the amount of a current amplitude A1 corresponding to the sum of these load currents of cooling fan 7, air conditioner 8 and defroster 9. Hence, as shown in FIG. 3D, the amount of electromagnetic noise caused by the change in the magnetic fields around the output line of the DC/DC converter 5 in connection with the drop of the current at the time t2 corresponds to that caused only by the load current of cooling fan 7, air conditioner 8 and defroster 9, and is therefore relatively small in comparison with the case in which the entire current including the charging current for 12 V battery 6 is totally shut off.

Furthermore, DC/DC converter 5 first detects the voltage Va dropping below the set value Vs2 at time t3, and subsequently recognizes the OFF state (IGOFF) of the ignition switch 17 as shown in FIG. 3B. Then, DC/DC converter 5 stops stepping down the voltage at the time t3 so that the charging current IV for 12 V battery 6 as the load current of DC/DC converter 5 is shut off. Hence, as shown in FIG. 3D, the amount of electromagnetic noise caused by the change in the magnetic fields around the output line of the DC/DC converter 5 in connection with the drop of the current amplitude A2 at the time t3 corresponds to that caused only by the charging current for 12 V battery 6, and is therefore relatively small in comparison with the case in which the entire current including the load current of cooling fan 7, air conditioner 8 and defroster 9 is totally shut off at one time.

As described above, the automotive electric power unit according to the present embodiment is configured in such a way that the set value Vs1 at which the switch off of ignition switch 17 is detected through voltage monitoring terminal 19-1a of ECU 19-1 is set higher than the set value Vs2 at which the switch off of ignition switch 17 is detected through ON/OFF control terminal 5a of DC/DC converter 5. Because of a feature wherein the potential difference between the terminals of the motor driving load 16 gently decreases for the time interval T after the shut down of the supply voltage on the terminals, ECU 19-1 first recognizes the OFF state of the ignition switch 17 and disconnects cooling fan 7, air conditioner 8 and defroster 9 from DC/DC converter as well as 12 V battery 6 by regulating relays 10, 13, and 14. DC/DC converter 5 subsequently recognizes the OFF state of the ignition switch 17 and stops converting the voltage into a lower level of voltage. In this way, because the load current of DC/DC converter 5 drops in two steps, the amount of electromagnetic noise caused by the rapid change in the load current is reduced in comparison with the case in which the entire current is shut down at one time.

Second Embodiment

Next, a second preferred embodiment will be explained with reference to the drawings.

Figure 4:
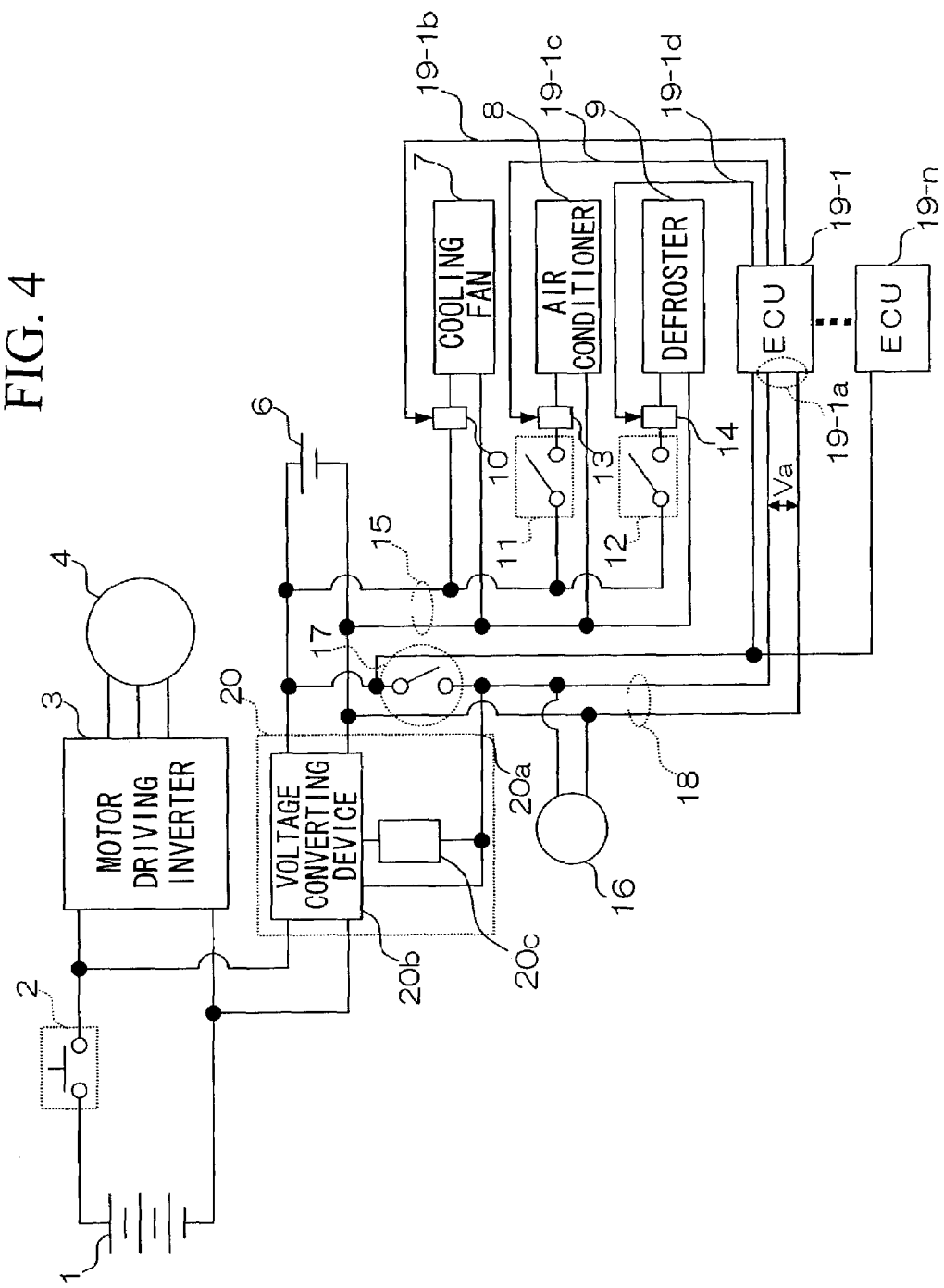
FIG. 4 is a block diagram showing a connection and a configuration of electrical equipment including an automotive electric power unit according to the second embodiment of the present invention.

FIG. 4 is a block diagram showing a connection and a configuration of electrical equipment including an automotive electric power unit according to the second embodiment of the present invention.

From FIG. 4, comparing the automotive electric power unit of the second embodiment with the automotive electric power unit of the first embodiment, it is understood that the DC/DC converter 5 of the automotive electric power unit of the first embodiment has been replaced with a DC/DC converter 20. In FIG. 4, reference numbers common with reference numbers of FIG. 1 represent the same or equivalent components described above in connection with FIG. 1, and therefore are not explained in the following discussion.

The DC/DC converter 20 includes a voltage converting device 20b, which steps down the voltage and is switched on/off according to a control signal input to an output control terminal 20a, and an output voltage setting device 20c which enables the voltage converting device 20b to vary the output voltage (i.e. the stepped down output voltage of the DC/DC converter) according to the control signal input to the output control terminal 20a. Here, only when the control signal input to the output control terminal 20a is in a "HIGH" state, voltage converting device 20b outputs the power so that the input power from the high voltage battery 1 is converted into the power at the voltage of 12 volts. The voltage converting device 20b stops stepping down the voltage, when the control signal input to the output control terminal 20a is in a "LOW" state.

The positive side of the connection lines 18 is connected to the output control terminal 20a so that the output voltage setting device 20c detects the switch off of ignition switch 17 through a change in the voltage which is input to output control terminal 20a via the connection lines 18. Output voltage setting device 20c regulates voltage converting device 20b and allows the level of the output voltage of DC/DC converter 20 to be at such a low level that 12 V battery 6 cannot be charged, and that an amount of the charging current for 12 V battery 6 is reduced in the total load current of DC/DC converter 20.

Here, a set value Vs3 (a first set value of voltage according to claim 5 of the present invention) at which output voltage setting device 20c detects timing for changing the output voltage to a lower voltage is set higher than a set value Vs4 (a second set value of voltage according to the fifth aspect of the present invention) at which the switch off of ignition switch 17 is detected through voltage monitoring terminal 19-1a of ECU 19-1. Also, a set value Vs4 at which the switch off of ignition switch 17 is detected through voltage monitoring terminal 19-1a of ECU 19-1 is set higher than a set value Vs5 at which voltage converting device 20b of DC/DC converter 20 detects the switch off of ignition switch 17.

In the following, the operating principles of the present embodiment of the present invention will be explained with reference to the accompanying drawings.

FIGS. 5A to 5E shows a diagram illustrating temporal variations of the operating status of the automotive electric power unit according to the present embodiment. As shown in FIG. 5A, after switch-off of the ignition switch 17 at time t1, a voltage Va on the output control terminal 20a of the DC/DC converter 20 gradually decreases for a time interval T due to the inductive voltage generated at both terminals of the motor driving load 16 connected to the connection lines 18 as shown in FIG. 5B. Thus, output voltage setting device 20c of DC/DC converter 20 first detects the voltage Va dropping below the set value Vs3 at time t4, and subsequently recognizes a state in which the output voltage should be changed to a lower voltage as shown in FIG. 5B. Then, as shown in FIG. 5C, output voltage setting device 20c reduces the output voltage of DC/DC converter 20 from a level for charging 12 V battery 6 (14.5 V for example) to a predetermined level disabling to charge it (12.5 V for example) so that an amount of the charging current IV for 12 V battery 6 of the total load current of DC/DC converter 5 is decreased at the time t4 in FIG. 5D.

At this moment, the output current of the DC/DC converter 20 is decreased by the amount of a current amplitude A3 corresponding to the charging current IV for 12 V battery 6. Hence, as shown in FIG. 5E, the amount of electromagnetic noise caused by the change in the magnetic fields around the output line of the DC/DC converter 20 in connection with the drop of the current amplitude A3 at the time t4 corresponds to that caused only by the charging current for 12 V battery 6, and is therefore relatively small in comparison with the case in which the entire current including the load current of cooling fan 7, air conditioner 8, and defroster 9 is totally shut off at one time.

Furthermore, ECU 19-1 first detects the voltage Va on the output control terminal 20a dropping below the set value Vs4 at time t5, and subsequently recognizes an OFF state (IGOFF) of the ignition switch 17, as shown in FIG. 5B. Then, ECU 19-1 regulates relays 10, 13, and 14, and disconnects cooling fan 7, air conditioner 8, and defroster 9 from DC/DC converter 20 as well as 12 V battery 6 as shown in FIG. 5C so that a load current of defroster I, a load current of air conditioner II, and a load current of cooling fan III become zero, and the output current of the DC/DC converter 20 is then decreased by the amount of a current amplitude A4 corresponding to the sum of these load currents of cooling fan 7, air conditioner 8 and defroster 9. Hence, as shown in FIG. 5E, the amount of electromagnetic noise caused by the change in the magnetic fields around the output line of the DC/DC converter 20 in connection with the drop of the current at the time t5 corresponds to that caused only by the load current of cooling fan 7, air conditioner 8 and defroster 9, and is therefore relatively small in comparison with the case in which the entire current including the charging current for 12 V battery 6 is totally shut off.

After ECU 19-1 regulates relays 10, 13, and 14, and disconnects cooling fan 7, air conditioner 8, and defroster 9 from DC/DC converter 20 as well as 12 V battery 6 at the time t5, DC/DC converter 20 detects the voltage Va on the output control terminal 20a dropping below the set value Vs5 and absolutely stops stepping down the voltage.

As described above, the automotive electric power unit of the present embodiment is configured in such a way that the set value Vs3 at which output voltage setting device 20c of DC/DC converter 20 detects timing for changing the output voltage to a lower voltage is set higher than the set value Vs4 at which the switch off of ignition switch 17 is detected through voltage monitoring terminal 19-1a of ECU 19-1. Because of a feature wherein the potential difference between the terminals of the motor driving load 16 gently decreases for the time interval T after the shut down of the supply voltage on the terminals, output voltage setting device 20c of DC/DC converter 20 recognizes a state in which the output voltage should be changed to a lower voltage, and reduces the output voltage of DC/DC converter 20 to such a level that disables the converter from charging 12 V battery 6. ECU 19-1 subsequently recognizes the OFF state of the ignition switch 17 and disconnects cooling fan 7, air conditioner 8, and defroster 9 from DC/DC converter as well as 12 V battery 6 by regulating relays 10, 13, and 14. In this way, because the load current of DC/DC converter 5 drops in two steps, the amount of electromagnetic noise caused by the rapid change in the load current is reduced in comparison with the case in which the entire current is shut off at one time.

In the first and second embodiments described above, motor driving load 16 is connected to the output side of DC/DC converter 5 and 20 by way of ignition switch 17 so that control over the sequence of the disconnection of the power loads such as cooling fan 7, air conditioner 8 and defroster 9 from DC/DC converter 5 and 20 and the stop of the voltage conversion becomes possible by taking advantage of a feature wherein the potential difference between the terminals of the motor driving load 16 gently decreases, although the supply voltage at its terminals is abruptly shut down. However, instead of the above-mentioned motor driving load 16, a capacitive load having a capacitance in its power load may be also used for a control as described in the first and second embodiments.

This is because, a capacitive load, which includes a capacitance between the positive and negative terminals in a d.c. circuit (in its power load) and accumulates charges (power) in the power load, discharges the accumulated charges (the power stored in the power load), although the supply voltage to the terminals is shut down. Therefore, the capacitive load produces a voltage or a potential difference between its two terminals through discharge so long as the accumulated charges remain. Thus, the capacitive load has a similar feature as that of the motor driving load 16 in such a way that the potential difference between the terminals gently decreases as the number of the charges slowly decreases, after the shut down of the supply voltage on the terminals.

In the first and second embodiments described above, relays 10, 13, and 14 are controlled all together, when the auxiliary machineries such as cooling fan 7, air conditioner 8, and defroster 9 connected to the DC/DC converters 5 or 20 are disconnected from DC/DC converters 5 or 20 by regulating relays 10, 13, and 14. However, it will be obviously understood by those skilled in the art that each auxiliary machinery described above may be individually disconnected from the DC/DC converter step by step so as to reduce the electromagnetic noise in connection with the decrease of the load current of DC/DC converters 5 and 20.

What is claimed is:

1. An automotive electric power unit having a first charging device, a second charging device charged by applying voltage which is stepped down from the electric energy accumulated in the first charging device by a DC/DC converter, and a control device controlling a plurality of power loads connected to the second charging device, wherein the control device first shuts down the power loads and subsequently allows the DC/DC converter stop stepping down the voltage, upon an ignition switch for actuating the vehicle being switched off.

2. An automotive electric power unit according to claim 1, wherein the automotive electric power unit having a motor driving load connected to said second charging device by way of said ignition switch and coming to a stop while generating an inductive voltage after the ignition switch being switched off; said control device shuts down said power loads when said inductive voltage dropping below a first set value of voltage; and said DC/DC converter stops stepping down the voltage when said inductive voltage dropping below a second set value of voltage which is lower than the first set value.

3. An automotive electric power unit according to claim 1, wherein the automotive electric power unit having a capacitive load connected to said second charging device by way of said ignition switch and providing a voltage or a discharge voltage arising between its both terminals through a discharge of the electric power stored in its power load after the ignition switch being switched off; said control device shuts down said power loads when said discharge voltage dropping below a first set value of voltage; and said DC/DC converter stops stepping down the voltage when said discharge voltage dropping below a second set value of voltage which is lower than the first set value.

4. An automotive electric power unit having a first charging device, a second charging device charged by applying voltage which is stepped down from the electric energy accumulated in the first charging device by a DC/DC converter, and a control device controlling a plurality of power loads connected to the second charging device, wherein the control device first allows the DC/DC converter decrease its stepped down output voltage and subsequently shuts down the power loads after the output voltage being decreased, upon an ignition switch for actuating the vehicle being switched off.

5. An automotive electric power unit according to claim 4, wherein the automotive electric power unit having a motor driving load connected to said second charging device by way of said ignition switch and coming to a stop while generating an inductive voltage after the ignition switch being switched off; said DC/DC converter decreases its stepped down output voltage when said inductive voltage dropping below a first set value of voltage; and said control device shuts down said power loads when said inductive voltage dropping below a second set value of voltage which is lower than the first set value.

6. An automotive electric power unit according to claim 4, wherein the automotive electric power unit having a capacitive load connected to said second charging device by way of said ignition switch and providing a voltage or a discharge voltage arising between its two terminals through a discharge of the electric power stored in its power load after the ignition switch being switched off; said DC/DC converter decreases its stepped down output voltage when said discharge voltage dropping below a first set value of voltage; and said control device shuts down said power loads when said discharge voltage dropping below a second set value of voltage which is lower than the first set value.

* * * * *